United States Patent [19]
Threlkeld

[11] 3,913,857
[45] Oct. 21, 1975

[54] LONG PLAY FILM CARTRIDGE

[76] Inventor: Richard James Threlkeld, 6736 Tobias, Van Nuys, Calif. 91405

[22] Filed: Aug. 2, 1974

[21] Appl. No.: 494,230

[52] U.S. Cl............. 242/55.19 A; 242/71.8; 352/78; 352/128
[51] Int. Cl.² ................ G11B 23/10; G03B 23/02; G03B 21/00
[58] Field of Search......... 242/55.19 A, 55.18, 71.8; 352/128, 78, 72

[56] References Cited
UNITED STATES PATENTS

| | | | |
|---|---|---|---|
| 2,864,611 | 12/1958 | Gray | 242/55.19 A |
| 2,921,787 | 1/1960 | Cousino | 242/55.19 A |
| 3,088,687 | 5/1963 | Martin | 242/55.19 A |
| 3,245,630 | 4/1966 | Morris et al. | 242/55.19 A |
| 3,568,943 | 3/1971 | Robak | 242/55.19 A |
| 3,790,261 | 2/1974 | Threlkeld | 352/72 |

Primary Examiner—Billy S. Taylor

[57] ABSTRACT

A continuous long play projector cartridge adapted to carry an endless spiral roll of film measuring 3,000 feet in length or more and wherein a film holding rotor supports said spiral roll of film on a generally disc-shaped array of spiral ribs having inner ends adjacent a hub portion of said rotor and outer ends directed toward a periphery of said rotor, the ribs diverging generally outward and the spiral shape of said ribs being such that the outer ends of said ribs near the periphery of said rotor trail the inner ends of said ribs in a direction of rotation of said rotor; the rotor being mounted in a housing provided with a cover and the spiral roll of film having a projector related loop extending outwardly from the cartridge housing and cover and first and second guide means for removing the film from the rotor adjacent to said hub and for guiding the film to a position outward beyond the periphery of said rotor and outward of said housing and for guiding the return of said film from said projector related loop over a spring loaded roller means which maintains tension of the film as it is wound on the periphery of the spiral roll of film carried on said spiral fingers of said roller; said spiral fingers being declined downwardly from their outer ends toward their inner ends and in a direction from the periphery of said rotor toward the central hub thereof.

6 Claims, 8 Drawing Figures

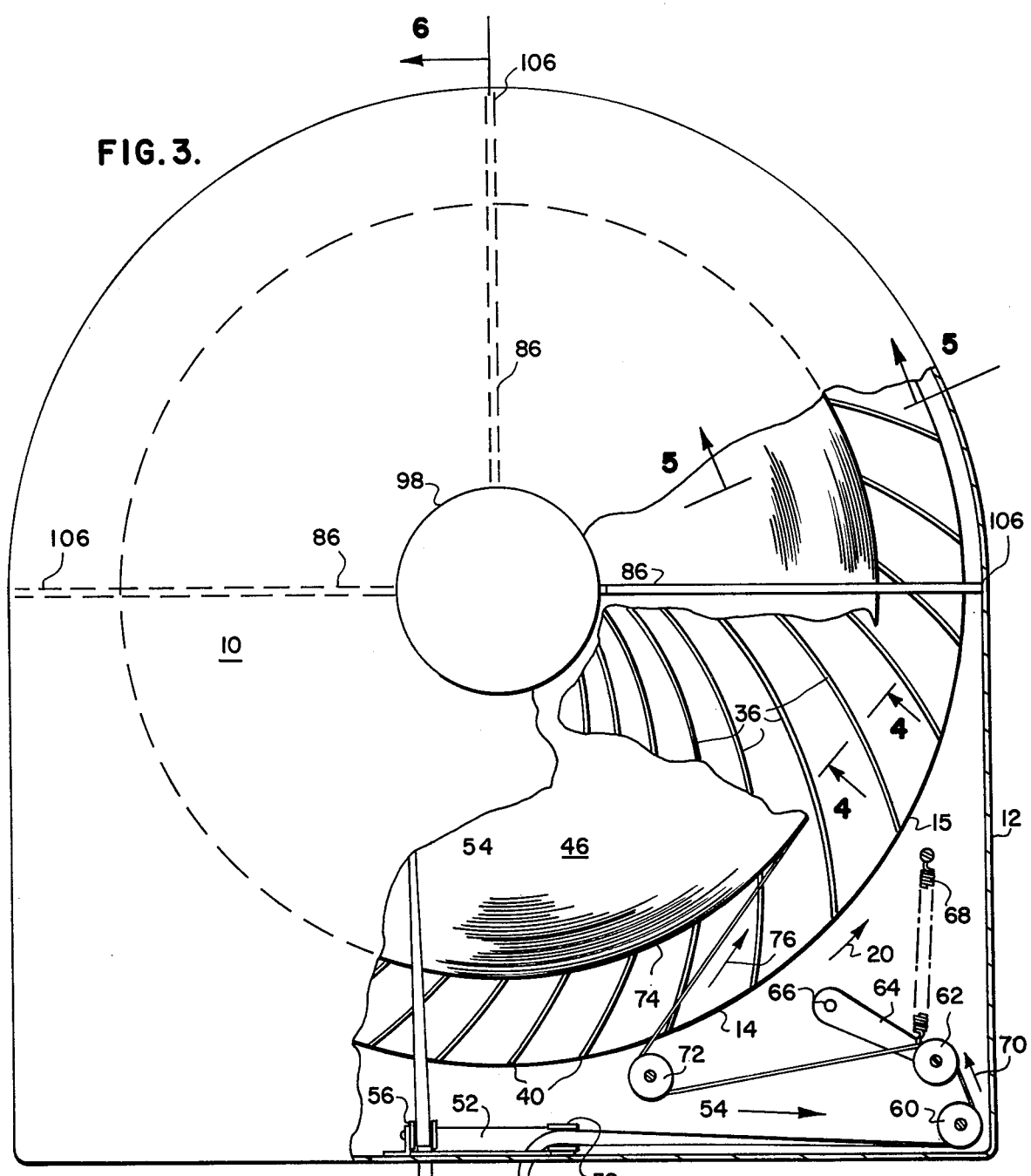
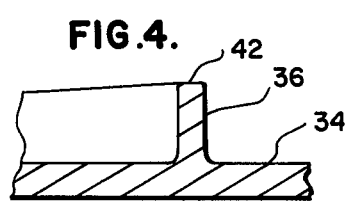
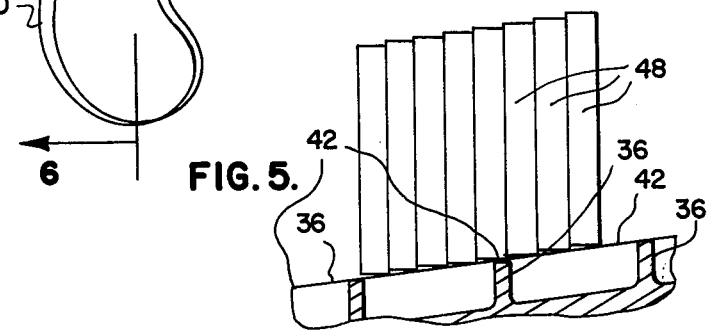

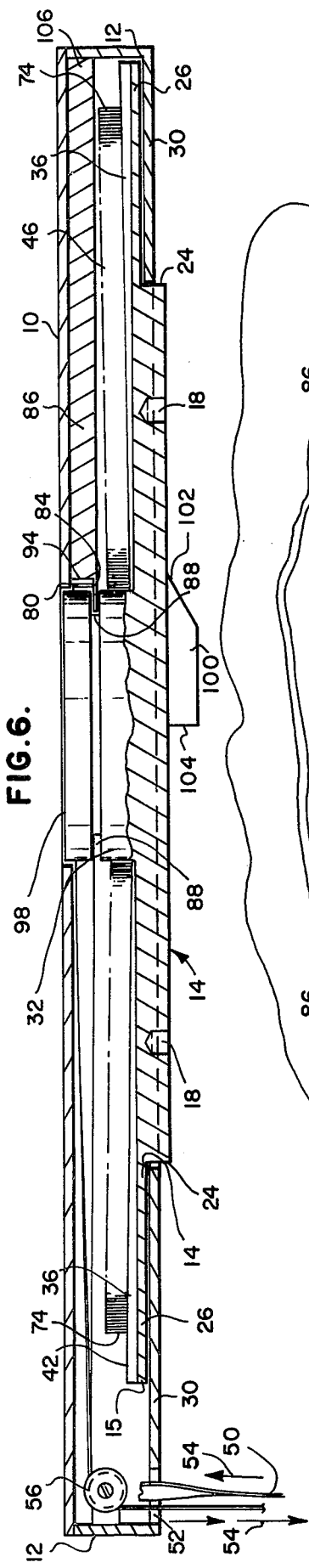
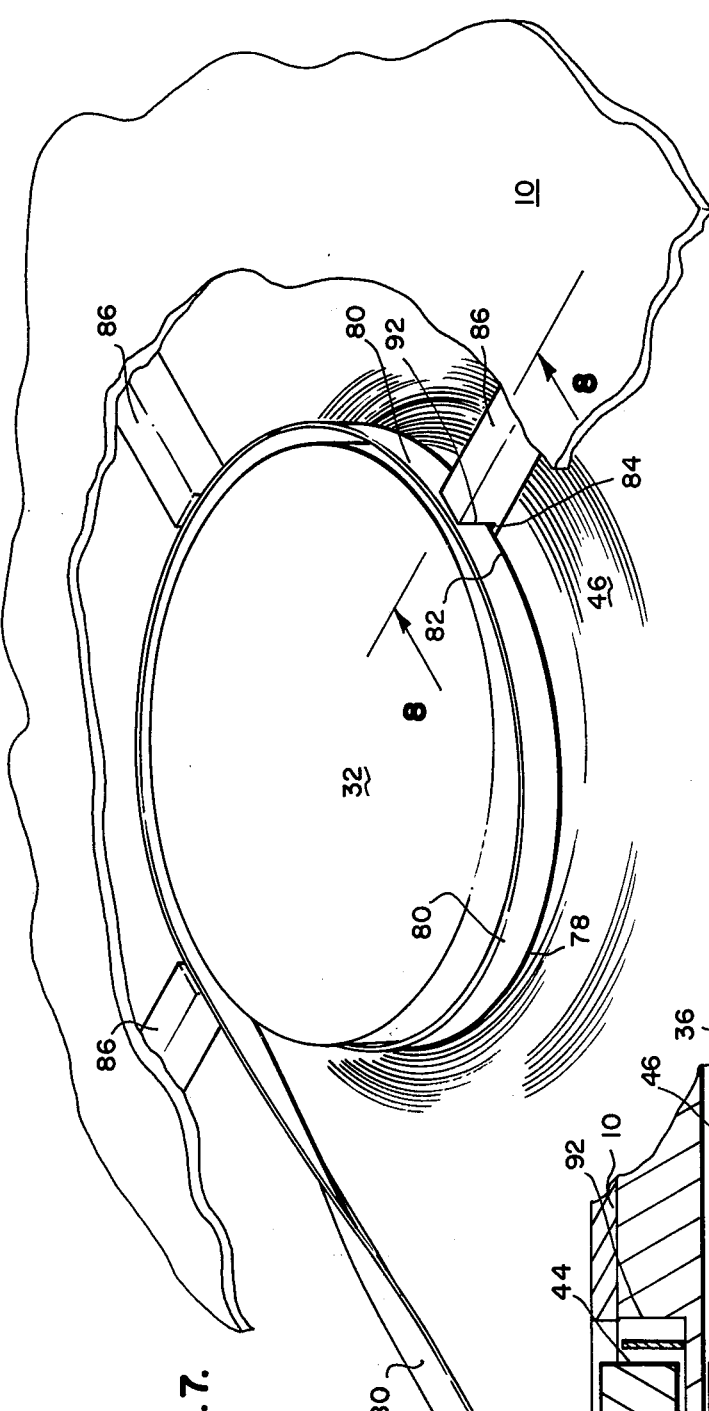
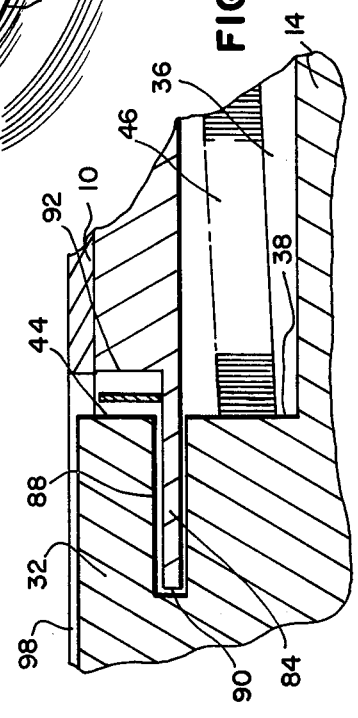

LONG PLAY FILM CARTRIDGE

BACKGROUND OF THE INVENTION

A long play projector cartridge of the prior art is disclosed in my former U.S. Pat. No. 3,790,261 issued Feb. 5, 1974 and patented cartridge contained a rotor having straight radially directed ribs arranged in a generally circular array and wherein the ribs radiated directly outward from the center of the film carrying rotor and declined from the periphery toward the center of the rotor.

SUMMARY OF THE INVENTION

My present invention is an improvement over the long play cartridge disclosed in the aforementioned U.S. Pat. No. 3,790,261 and the cartridge rotor of the present invention comprises a generally circular film holding rotor having a circular array of outwardly diverging film carrying ribs which are spiral in shape and having inner ends of the ribs adjacent a central hub portion of the rotor while outer ends of the ribs are directed toward the periphery of the rotor and the outer ends trail the inner ends in a direction of rotation of the rotor and the upper surfaces of the ribs decline downwardly from the outer ends thereof toward the inner ends thereof thus providing a generally disc-shaped film supporting rotor structure adapted to carry a spiral roll of film having contiguous convolutions which progress from the periphery thereof toward the central portion of the rotor at which the film is removed over first film elevating means and from which it is guided to a projector related loop of film outside the cartridge and then returned over a spring loaded guide roller means to the periphery of the spiral roll of film on said ribs.

The spiral shape of the ribs greatly improves the function of the present cartridge as compared to that of the corresponding cartridge disclosed in said aforementioned U.S. Pat. No. 3,790,261. Further the details of the film guide means of the present invention is substantially simple and very reliable.

Accordingly, it is an object of the invention to provide an improved continuous long play projector cartridge wherein outwardly radiating spiral shaped ribs support a spiral roll of film and wherein the outer ends of the film supporting ribs trail the inner ends of the ribs in a direction of rotation thereby tending to hold the convolutions of the roll of film outwardly toward the periphery of the rotor so that the center of the roll of film surrounding the hub of the rotor is free to move upwardly over elevating guides which elevate the film edgewise above the plane of the spiral roll and allow it to be guided to a position of a projector related loop of film outside of the cartridge housing so that the projector related loop may be continuously run through a movie projector.

Another object of the invention is to provide a novel assembly of generally spiral shaped ribs on a film supporting rotor of generally disc-shaped construction which serves to provide winding and unwinding control of a spiral roll of film such that a great amount of film in a large diameter spiral roll may be continuously and smoothly operated to provide for long play movies involving over 3000 feet of film.

Further objects and advantages of the invention may be apparent from the following specification, appended claims and accompanying drawings.

BRIEF DESCRIPTION OF THE DRAWINGS

FIG. 3 is an enlarged fragmentary top of plan view of the cartridge shown in FIG. 1 illustrating portions broken away to amplify the illustration;

FIG. 4 is an enlarged fragmentary sectional view taken from the line 4—4 of FIG. 3;

FIG. 5 is an enlarged fragmentary sectional view taken from the line 5—5 of FIG. 3;

FIG. 6 is an enlarged sectional view taken from the line 6—6 of FIG. 3 showing the projector related loop of film of the cartridge fragmentarily;

FIG. 7 is an enlarged plan perspective view of the cartridge of the invention showing portions of the structure fragmentarily and illustrating the film elevating means of the invention adjacent the hub of the film elevating roller whereon the film is elevated around the central hub of the rotor from the central portion of a spiral roll of film on the rotor; and FIG. 8 is an enlarged fragmentary sectional view taken from the line 8—8 of FIG. 7.

DESCRIPTION OF THE PREFERRED EMBODIMENTS

Figure 1:
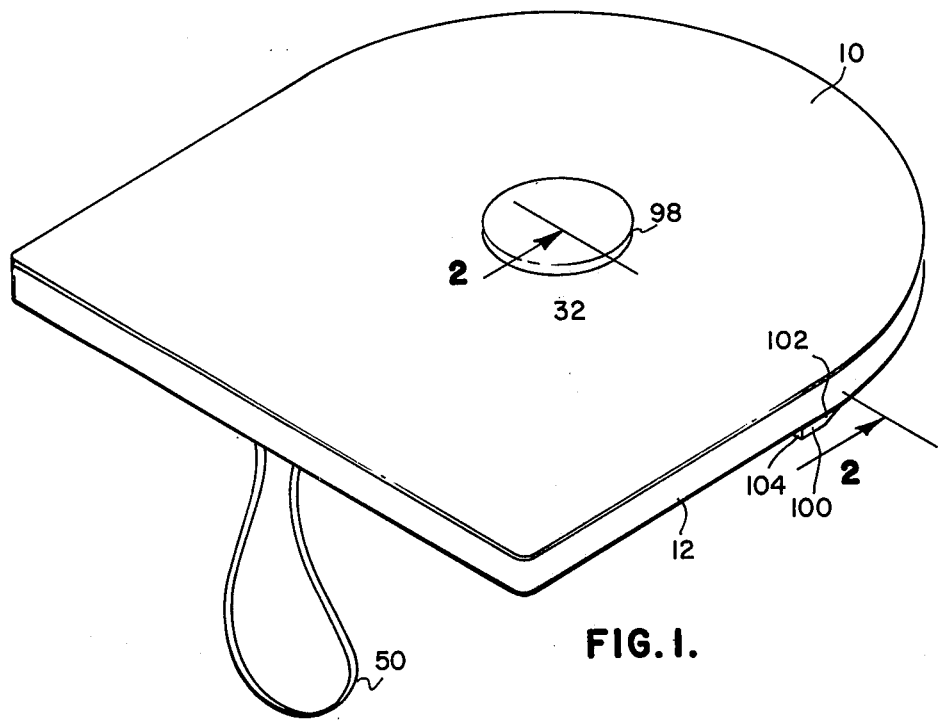
FIG. 1 is a perspective view of a continuous long play projector cartridge with a projector related loop of film extending therefrom.

The film cartridge of the invention is provided with a cover 10 as shown in FIG. 1 of the drawings and a housing 12 on which the cover is disposed.

Figure 2:
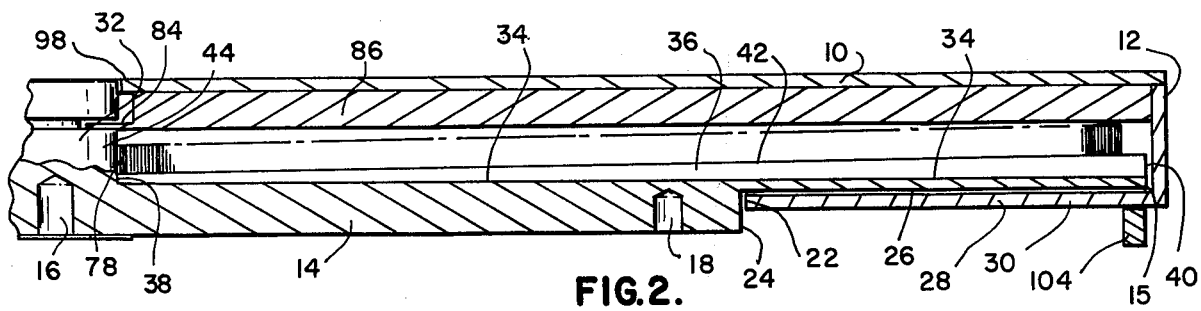
FIG. 2 is an enlarged fragmentary sectional view taken from the line 2—2 of FIG. 1.

As shown in FIGS. 2, 3 and 6, a film holding rotor 14 is rotatably mounted in the housing 12 below the cover 10 and this rotor 14 is provided with drive means comprising a centrally located pilot opening 16 and a secondary drive pin opening 18 spaced from the pilot opening 16 so that when the cartridge is placed in a drive means which is no part of the present invention the rotor 14 may be rotated relative to the housing 12 and beneath the cover 10.

The direction of rotation of the rotor 14 is as indicated by an arrow 20 in FIG. 3 as will hereinafter be described in detail.

The housing 12 is provided with a central opening 22 through which a concentric disc-shaped portion 24 of the rotor 14 extends with sufficient clearance to run or rotate freely in the opening 22.

At extending disc portion 26 of the rotor 14 is integral with the portion 24 and is disposed above a lower wall structure 28 of the housing 12 and is adapted to run freely relative thereto when the disc shaped portion 14 is supported on a suitable drive means thereby allowing the rotor 14 to float in the housing 12 which is supported at its lower surface 30 by a suitable frame structure in relation to the drive means which rotates the rotor 14.

The rotor 14 is provided with a centrally disposed generally annular hub portion 32 which is integral with the disc shaped portion 14 and an upper surface 34 of the disc shaped portions 14 and 26 is provided with integral upwardly directed film supporting ribs 36 which are shaped generally as shown in FIG. 3, 4 and 5 of the drawings. These ribs 36 as shown in FIG. 4 and 5 extend upwardly from the upper surface 34 of the basic rotor structure and the ribs 36 as shown in FIG. 3 are arranged in a circular assembly and are spiral shaped and diverge from inner ends 38 of said ribs to outer ends 40 thereof all shown best in FIGS. 2 and 3 of the drawings. These ribs 36 are spiral shaped and the outer ends 40 trail the inner ends 38 in a direction of rotation as indicated by the arrow 20 and additionally these ribs are declined toward the rotor 32 from the ends 40 to provide for a generally disc shaped assembly at the upper surface of the rotor 14. Thus the upper disc shaped surface structure of rotor is defined by the upper edges 42 of the ribs 36 which are declined in a direction from the peripheral portion 15 of the rotor 14 toward the hub 32 thereof.

The inner ends 38 of the ribs 36 terminate at the periphery 44 of the hub 32 as shown best in FIG. 2 of the drawings. As shown in FIGS. 3 and 5 of the drawings, a spiral roll of film designated 46 is provided with contiguous convolutions 48 and these convolutins comprise an endless film having a projector related loop 50 disposed outside the housing 12 and this projector related loop 50 is adapted to run through a conventional movie projector.

The housing 12 as shown in FIGS. 3 and 6 of the drawings is provided with an opening 52 in the bottom portion 30 thereof. This opening 52 is outward beyond a peripheral portion 15 of the rotor 14 and the projected related loop 50 shown fragmentarily in FIG. 6 extends through the opening 52. The projector related loop passes in the direction of the arrow 54 shown in FIGS. 3 and 6 and a film supporting roller 56 mounted on the inner side wall of the housing 12 guides the projector related loop outwardly through the opening 52 while another roller 58 mounted adjacent the opening 52 guides the projector related loop backwardly into said housing and toward another stationary film supporting roller 60 mounted in said housing.

A spring loaded roller 62 is rotatably mounted on a movable arm 64 which is pivoted on a pin 66 secured to the bottom 30 of the housing 12 and a spring 68 tends to move the roller 62 in the direction of an arrow 70 thereby tending to take up the slack of the film between the roller 60 and another film holding roller 72 which is stationarily rotatably mounted on the lower portion 30 of the housing 12. This roller 72 guides the film onto the periphery 74 of the spiral roll of film 46 which rests on the upper surfaces 42 of the spiral ribs 36 as shown in FIG. 5. The convolutions of the film passing on to the periphery of the spiral roll 46 as indicated by an arrow 76 causes the adjacent convolutions 48 to be contiguous as shown in FIG. 5.

The inner end of the spiral roll designated 78 in FIG. 7 of the drawings is maintained loosely spaced around the hub 32 of the rotor 14 and the film designated 80 in FIG. 7 of the drawings is elevated upwardly from the central opening in the spiral roll 46 and a lower edge of the film portion 80 is designated 82 and this edge 82 passes upwardly over an elevating member 84 shown in FIGS. 6, 7 and 8 of the drawings. The elevating member 84 is carried by a bar 86 there being three bars 86 and three elevating members as will be hereinafter described each being integral with each bar 86.

As shown best in FIG. 8 of the drawings the rotor 32 is provided with a peripheral groove 88 into which ends 90 of the elevating members 84 extend and these elevating members extend a substantial distance from the periphery 44 of the hub 32 so as to provide a substantial space between a vertical surface 90 of each bar 86 and the respective peripheral portion 44 of the hub 32 all as shown best in FIGS. 7 and 8 of the drawings. It will be seen that there are three of the bars 86 each having an elevating member 84 over which the lower edge 82 of the film portion 80 is elevated and guided substantially 180 degrees around the hub 32 such that the film 80 passes in a direction of an arrow 54 to the roller 56 as shown best in FIG. 6 and 7 of the drawings. The cover 10 is provided with a central opening 98 above and surrounding the rotor 32 so as to provide a view of the film portion 80 as it passes upwardly over the elevating members 84 hereinbefore described.

In operation the film holding rotor is floatingly operated in the housing 12 above the lower wall portion 30 and concentrically of the opening 22 as hereinbefore described and the film winding on the periphery 74 of the spiral roll 46 as indicated by the arrow 72 is wound on the spirally directed ribs 36 at their upper surface portions 42 and the spiral direction of these ribs tends to compact the film outwardly away from the hub portion 32 so that the film is relatively loose at its central opening 78 around the hub 32 enabling the film to be readily moved upward over the elevated guide members 84 and to the projector related loop 50 of the film as hereinbefore described.

The lower surface of the housing 12 is provided with a pair of locking projections 100 having inclined edges 102 and buttress edges 104 adapted for holding the cartridge in location relative to a driving rotor, the cooperative parts of which are no part of the present invention.

The structural support for the members 86, of which the elevating members 84 are integral, are fixed to the cover 10 as shown best in FIGS. 3 and 6 of the drawings. Thus the manner of assembling the cartridge comprises the mounting of the rotor 14 together with the cover 10 in the housing in the position shown in FIG. 6 with the helically inclined portion 80 of the film disposed on the elevating members 84 which are disposed in the groove 88 of the hub 32. The central opening 98 in the cover 10 provides a view of the film as it passes upwardly over the guide members 84 on its way toward the roller 56 and the projector related loop 50 of the film as it passes from the portion 80 from the middle of the spiral roll 46 thereof.

It will be obvious to those skilled in the art that various modifications of the invention may be resorted to without departing from the spirit thereof.

I claim:

1. In a continuous long play projector cartridge, the combination of: a base cartridge housing structure; a cover for said base housing structure; a film holding rotor rotatably mounted in close proximity to said base housing and disposed beneath said cover; said film holding rotor being generally circular and rotatable about a substantially vertical axis of rotation; said rotor having a peripheral portion; drive means on said rotor adapted for rotatably driving said film holding rotor relative to said base housing structure and said cover; said film holding rotor having a generally disc-shaped upper side adapted to hold an endless spiral roll of film thereon; said disc-shaped upper side of said film holding rotor having a centrally located upstanding generally annular hub; said upper side of said rotor having a generally circular array of film holding ribs; each rib being of a generally spiral shape and each of said ribs having an inner end directed towards said hub; each of said ribs extending in a direction away from said hub and outwardly in a generally spiral direction toward said peripheral portion of said film holding rotor; said ribs having upper edges declined relative to the horizontal in a direction toward said hub of said film holding rotor; first film elevating means disposed adjacent said hub; said elevating means having film engaging surface portions spaced above said ribs and above said spiral roll of film thereon; said film engaging surface portions disposed and adapted to lift said film above said spiral roll in closely adjacent relation to said hub; said film holding rotor having a direction of rotation about said axis of rotation; outer ends of said ribs being adjacent to said periphery of said rotor and spirally trailing behind said inner ends of said ribs in said direction of rotation; said cartridge having second film guide means adjacent said periphery of said film holding rotor; said second film guide means disposed and adapted to guide film onto said film holding rotor at a location substantially spaced radially from said hub thereof; a spiral roll of film on said rotor; said spiral roll of film comprising spiral convolutions, said spiral roll having a periphery disposed at said location; said spiral roll of film being a continuous and endless loop and comprising a projector related film portion disposed outside said cartridge and between said first and second film guide means; said film being a thin, flat, flexible film having opposite edges and opposite sides; said opposite sides being contiguous in said spiral roll on said film holding rotor.

2. The invention as defined in claim 1, wherein: said hub is provided with a peripheral groove disposed substantially above said spiral roll of film; said first film elevating means comprising members projecting into said grooves and extending radially outward from said hub; said members having upper surface portions adapted to serve as elevating guides for film moving from said spiral roll adjacent said hub and for elevating said film above said spiral roll in a direction around said hub; there being a plurality of said members spaced substantially 180° around said hub.

3. The invention as defined in claim 2, wherein: said spiral shaped ribs at said inner ends thereof being contiguous with said hub and adapted to push the film from the middle of the film coil.

4. The invention as defined in claim 2, wherein: said second film guide means comprises a spring loaded guide roller over which said film is disposed outward from the periphery of said rotor for holding slight tension in said film and said roll as it is wound on the periphery of said roll of film.

5. The invention as defined in claim 1, wherein: said film holding rotor is provided with a portion projecting below said housing and comprising said drive means; said portion projecting below said housing being supportable in such a manner that said rotor operates floatingly in said housing below said cover.

6. The invention as defined in claim 4, wherein: said housing is provided with a guide roller spaced from the periphery of said rotor and adapted to receive film from an area of said first film elevating means; said projector related loop disposed between said spring loaded guide roller and said last mentioned roller.

* * * * *